(12) United States Patent
Lei et al.

(10) Patent No.: US 12,596,672 B2
(45) Date of Patent: Apr. 7, 2026

(54) SYSTEM MANAGEMENT SOFTWARE WITH SYSTEM VITAL PRODUCT DATA (SVPD) FOR COMPARING FIRST AND SECOND SERVER IDENTITY DATA

(71) Applicant: Lenovo (Beijing) Limited, Beijing (CN)

(72) Inventors: Ming Lei, Beijing (CN); Fred Allison Bower, III, Durham, NC (US); Caihong Zhang, Beijing (CN); Jihao Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 231 days.

(21) Appl. No.: 18/484,967

(22) Filed: Oct. 11, 2023

(65) Prior Publication Data

US 2024/0126715 A1    Apr. 18, 2024

(30) Foreign Application Priority Data

Oct. 12, 2022    (CN) .......................... 202211245302.6

(51) Int. Cl.
*G06F 15/78* (2006.01)
*G06F 15/177* (2006.01)

(52) U.S. Cl.
CPC ........ *G06F 15/7871* (2013.01); *G06F 15/177* (2013.01); *G06F 15/78* (2013.01)

(58) Field of Classification Search
CPC ..... G06F 15/7871; G06F 15/78; G06F 15/177
See application file for complete search history.

(56) References Cited

U.S. PATENT DOCUMENTS

| | | | | |
|---|---|---|---|---|
| 8,615,680 B2 * | 12/2013 | Boecker | .............. | G06F 11/1092 714/6.24 |
| 10,191,729 B2 * | 1/2019 | Lee-Baron | ................ | G06F 8/61 |
| 11,513,695 B2 * | 11/2022 | Yardley | ................ | G06F 11/008 |
| 2012/0303940 A1 * | 11/2012 | Grice | ...................... | G06F 8/654 713/1 |
| 2017/0109046 A1 * | 4/2017 | Bender | ................ | G06F 3/0604 |

* cited by examiner

*Primary Examiner* — Tammara R Peyton
(74) *Attorney, Agent, or Firm* — ANOVA LAW GROUP, PLLC

(57) ABSTRACT

A method for replacing at least one hardware assembly of a data processing apparatus includes managing, by a system management software, the data processing apparatus with a service processor and a plurality of hardware assemblies, obtaining, by the system management software, first system configuration data, first system vital product data (SVPD), and first server identity data of the data processing apparatus from the service processor or through the service processor, obtaining, by the system management software, second SVD and second server identity data of the data processing apparatus from the service processor or through the service processor, comparing, by the system management software, the first server identity data with the second server identity data, and configuring, by the system management software, the data processing apparatus based on the first system configuration data and the first SVPD according to a comparison result.

16 Claims, 4 Drawing Sheets

System management software        System/baseboard management controller

S100
S106
S110
S118
S122
S124 — No / Yes
S126

S102
S104
S108
S112
S114
S116
S120
S128

System management
software

System/baseboard
management controller

S100

S102

S106

S104

S110

S108

S118

S112

S122

S114

S116

No

S124

S120

Yes

S126

S128

| Assembly | Type/Model | Part No. | Serial No./Part ID |
|---|---|---|---|
| System board | 7X05CTO1WW | 01PE247 | J300CKTT |
| CPU 1 | Intel(R) Xeon(R) Gold 5218T CPU @ 2.10GHz | N/A | 3230 3735 3539 3330 (20755930) |
| Dual in-line memory module 5 | DDR4 | M393A1K43BB1-CTD | 37EA64FE |
| dual in-line memory module 8 | DDR4 | M393A1K43BB1-CTD | 37EA65D8 |
| Backplane | N/A | SC57A01988 | W3ZS86T00CP |
| Magnet disc array adapter | ThinkSystem RAID 530-8i Pcle 12Gb Adapter | SR17A04503 | SP82402519 |
| Driver | 1.00TB 7.2K 6Gbps SATA 3.5" HDD | D7A01887 | T4PWJ6BC |
| Power supply unit 1 | N/A | SP57A03098 | P5LD876015B |
| Power supply unit 2 | N/A | SP57A03098 | P5LD87601HJ |

FIG. 3A

| Assembly | Type/Model | Part No. | Serial No./Part ID |
|---|---|---|---|
| System board | 7X05CTO1WW | 01PE247 | J300CKW0 |
| CPU 1 | Intel(R) Xeon(R) Gold 5218T CPU @ 2.10GHz | N/A | 3030 3032 3635 3330 (00026530) |
| Dual in-line memory module 5 | DDR4 | M393A1K43BB1-CTD | 37EA64FE |
| dual in-line memory module 8 | DDR4 | M393A1K43BB1-CTD | 37EA65D8 |
| Backplane | N/A | SC57A01988 | W3ZS86T00CP |
| Magnet disc array adapter | ThinkSystem RAID 530-8i Pcle 12Gb Adapter | SR17A04503 | SP82402519 |
| Driver | 1.00TB 7.2K 6Gbps SATA 3.5" HDD | D7A01887 | T4PWJ6BC |
| Power supply unit 1 | N/A | SP57A03098 | P5LD876015B |
| Power supply unit 2 | N/A | SP57A03098 | P5LD87601HJ |

FIG. 3B

SYSTEM MANAGEMENT SOFTWARE WITH SYSTEM VITAL PRODUCT DATA (SVPD) FOR COMPARING FIRST AND SECOND SERVER IDENTITY DATA

CROSS-REFERENCE TO RELATED APPLICATION

The present disclosure claims priority to Chinese Patent Application No. 202211245302.6, filed on Oct. 12, 2022, the entire content of which is incorporated herein by reference.

TECHNICAL FIELD

The present disclosure relates to a method for replacing one or more hardware assemblies in a data processing apparatus, such as a computer server.

BACKGROUND

After replacing a hardware assembly (e.g., a motherboard) of a data processing apparatus (e.g., a computer server), system vital product data (SVPD) and configuration data of a system also need to be restored in the computer server, which is performed manually.

If a plurality of servers of a client data center needs to be replaced with hardware (e.g., the motherboard), the SVPD and the configuration data of the system need to be restored for each computer server, which causes significant downtime and high service cost.

Thus, the present disclosure provides a hardware replacement method and a data processing apparatus, which are used to solve the above disadvantage or at least provide an alternative solution for the market.

SUMMARY

According to a first aspect of the present invention, there is provided a method for replacing at least one hardware assembly of a data processing apparatus. The method includes managing, by a system management software, the data processing apparatus with a service processor and a plurality of hardware assemblies, obtaining, by the system management software, first system configuration data, first system vital product data (SVPD), and first server identity data of the data processing apparatus from the service processor or through the service processor, obtaining, by the system management software, second SVD and second server identity data of the data processing apparatus from the service processor or through the service processor, comparing, by the system management software, the first server identity data with the second server identity data, and configuring, by the system management software, the data processing apparatus based on the first system configuration data and the first SVPD according to a comparison result.

According to a second aspect of the present invention, there is provided a data processing apparatus managed by system management software, including a plurality of hardware assemblies and a service processor. The service processor is configured to execute the system management software to manage the data processing apparatus, obtain first system configuration data, first system vital product data (SVPD), and first server identity data of the data processing apparatus, obtain second SVD and second server identity data of the data processing apparatus, compare the first server identity data with the second server identity data, and configure the data processing apparatus based on the first system configuration data and the first SVPD according to a comparison result.

BRIEF DESCRIPTION OF THE DRAWINGS

FIG. 3A illustrates a schematic diagram showing exemplary hardware vital product data (VPD) of a computer server before replacing a motherboard and a central processing unit (CPU) according to some embodiments of the present disclosure.

FIG. 3B illustrates a schematic diagram showing exemplary hardware VPD of the computer server in FIG. 3A after replacing the motherboard and the CPU according to some embodiments of the present disclosure.

DETAILED DESCRIPTION OF THE EMBODIMENTS

Figure 1:
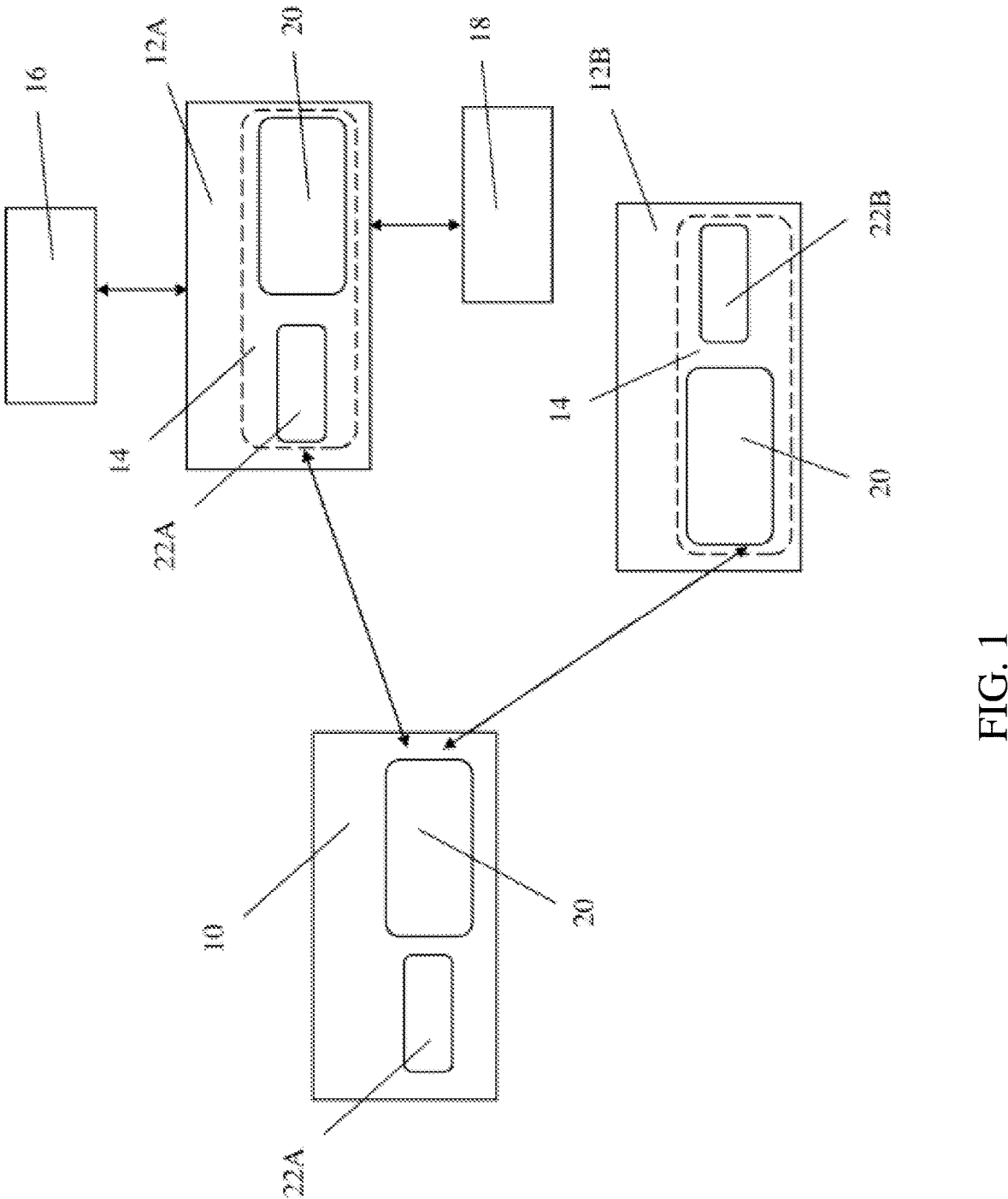
FIG. 1 illustrates a schematic diagram showing an interaction between system management software and a computer server for performing replacement on a hardware assembly of the computer server before and after replacing at least one hardware assembly in the computer server according to some embodiments of the present disclosure.

As shown in FIG. 1, system management software 10 is operationally associated with a computer server (i.e., a server) and is used to replace a to-be-replaced hardware assembly, e.g., a motherboard. In some embodiments, the system management software 10 can be used to manage the server. To facilitate the description, a server before the motherboard replacement (i.e., pre-replacement server) is denoted as 12A, and a server after the motherboard replacement (i.e., post-replacement server) is denoted as 12B.

In some embodiments, the system management software can be a tool configured to manage an information technology system of a network or a data center and can provide functions, including service desk, hardware management (inventory and configuration), software management (inventory), network monitoring, security, performance analytics, and automated backup and recovery.

Exemplary system management software of the present disclosure can include a centralized resource-management solution under the trade name Lenovo® XClarity® Administrator and open-source management software under the trade name Ansible®.

For example, Lenovo® XClarity® Administrator can run as a virtual apparatus that performs automated recovery, inventory, tracking, monitoring, and supply on a server, a network, and storage hardware in a secure environment. The system management software provides a central interface to cause a management device to perform hardware management, hardware monitoring, configuration management, firmware compliance and updates, operating-system deployment, user management, device authentication, security, service and support, task automation using scripts, integration with other managed software, and documentation.

The pre-replacement server 12A includes a service processor, such as a baseboard management controller (BMC) 14, which is connected to a unified extensible firmware interface (UEFI) 16. The BMC 14 can obtain the system configuration data of server 12A via UEFI 16. The BMC 14 can also obtain the system vital product data (SVPD) 18 from server 12A. The SVPD can include a system serial number, a system machine type, etc. The BMC 14 can also store hardware vital product data (VPD) of various hardware assemblies, such as a motherboard, a hard drive (HDD), a backplane, a central processing unit (CPU), a dual in-line memory module (DIMM) (i.e., a RAM stick), a peripheral component interconnect express (PCIe) adapter, a PCIe riser card, and a power supply unit (PSU), of the server 12A. The VPD of the hardware assembly (i.e., hardware VPD or HWVPD) can include details, such as a product type/model number, a part number, a serial number/part ID, a universally unique identifier (UUID), a product release level, a maintenance level, and other information specific to a corresponding hardware assembly. The combination of the hardware VPD can be used as server identity data of the pre-replacement server 12A. Thus, the BMC 14 of server 12A can include the SVPD, the system configuration detail 20, and the server identity data HWVPD of the server 12A. To facilitate description, the server identity data HWVPD before replacing the replacement (i.e., pre-replacement server identity data HWVPD) can be denoted by 22A, and the server identity data HWVPD after replacing the original motherboard by a replacement motherboard (i.e., post-replacement server identity data HWVPD) can be denoted by 22B.

The system management software 10 can obtain and store the SVPD, system configuration details 20, and pre-replacement server identity data HWVPD 22A of the server 12A from or through the BMC 14 of the server 12A as a backup.

When the server 12A has a hardware issue, e.g., a malfunction in the motherboard, a service staff can replace the motherboard having the malfunction with a replacement motherboard (including one or more replacement hardware assemblies) and then connect the post-replacement server 12B back to the network.

The system management software 10 can discover the post-replacement server 12B having the replacement hardware (e.g., the motherboard), and then retrieve the SVPD, system configuration details 20, and post-replacement server identity data HWVPD 22B of the server 12B through the BMC 14 of the server 12B. Then, the system management software 10 can compare the SVPD, system configuration details 20, and post-replacement server identity data HWVPD 22B of the server 12B with the SVPD and, system configuration details 20, and pre-replacement server identity data HWVPD 22A of the pre-replacement server 12A stored in the system management software 10. If the system management software 10 determines that an identical percentage between the post-replacement server identity data HWVPD 22B and the pre-replacement server identity data HWVPD 22A exceeds a predetermined percentage (e.g. 50%), and the SVPD before replacing the hardware assembly (i.e., the pre-replacement SVPD) is different from the SVPD after replacing the hardware assembly (i.e., the post-replacement SVPD), the system management software 10 can prompt the user to restore the pre-replacement SVPD and the system configuration data to the server 12B. Moreover, when the confirmation input from the user is received, the post-replacement server 12B can be configured based on the pre-replacement SVPD and the pre-replacement system configuration data.

Figure 2:
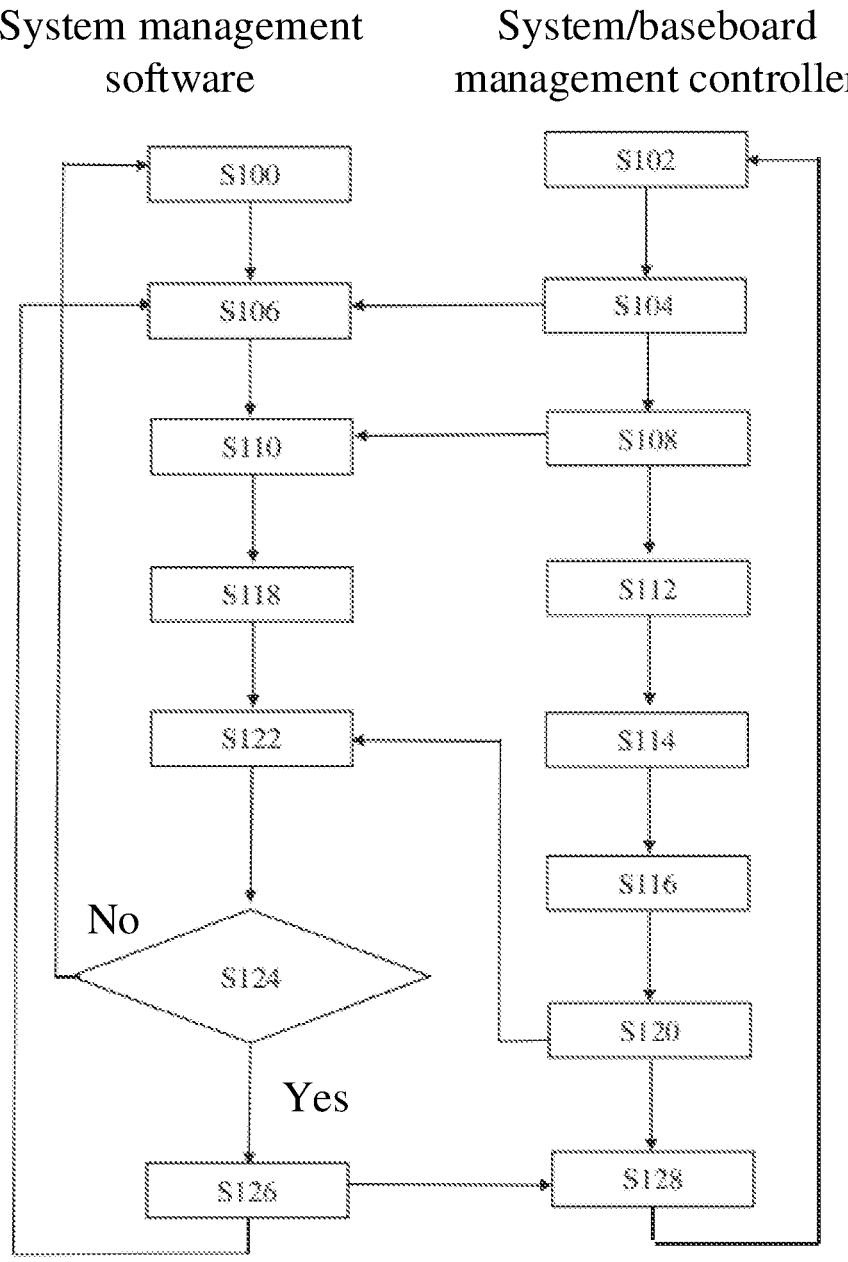
FIG. 2 illustrates a schematic flowchart of a hardware replacement method according to some embodiments of the present disclosure.

FIG. 2 illustrates a schematic flowchart of a hardware replacement method according to some embodiments of the present disclosure. At S100, the system management software 10 runs. At S102, the BMC 14 of the pre-replacement server 12A runs. At S104, the BMC 14 can provide the pre-replacement SVPD and the system configuration data 20 of the pre-replacement server 12A to the system management software 10. At S106, the system management software 10 stores the pre-replacement SVPD and the system configuration data 20 of the pre-replacement server 12A as a backup. At S108, the BMC 14 also provides the pre-replacement server identity data HWVPD 22A of the server 12A to the system management software 10. At S110, the system management software 10 stores the pre-replacement server identity data HWVPD 22A of the pre-replacement server 12A as a server identity.

At S112, assume that a hardware assembly (e.g., the motherboard) of server 12A encounters a problem. At S114, the original motherboard is replaced by a replacement motherboard. At S116, the post-replacement server 12B is connected back to the management network. At S118, at the system management software 10, when the server 12A encounters a hardware issue (e.g., an issue relating to the motherboard), the original motherboard is replaced with a replacement motherboard, and the post-replacement server 12B is connected back to the network.

At S120, the BMC 14 then collects and makes all the post-replacement server identity data HWVPD 22B and the post-replacement SVPD available for checking by the system management software 10. At S122, when the system management software 10 discovers the post-replacement server 12B, the system management software 10 retrieves and compares the post-replacement server identity data HWVPD 22B and the post-replacement SVPD with the previously stored pre-replacement server identity data HWVPD 22A and the pre-replacement SVPD. At S124, the system management software 10 then compares and checks whether the similarity percentage between the pre-replacement server identity data HWVPD 22A and the post-replacement server identity data HWVPD 22B exceeds the predetermined percentage, e.g., 50%, and detects whether the pre-replacement SVPD of the server 12A is different from the post-replacement SVPD of the post-replacement server 12B. If the similarity percentage exceeds the predetermined percentage, and the pre-replacement SVPD of the server 12A is different from the post-replacement SVPD of the post-replacement server 12B, the system management software 10 can identify the post-replacement server 12B as the pre-replacement server 12A in which only one or more hardware assemblies (e.g., the motherboard) are replaced. Then, the system management software 10 can output a request for confirmation to prompt the user (e.g., the service staff) to restore the pre-replacement SVPD and the pre-replacement system configuration data to the post-replacement server 12B. At S128, when receiving the confirmation from the user (e.g., the service staff), the system management software 10 can continue to restore the pre-replacement SVPD and the pre-replacement system configuration to the post-replacement computer server 12B through the BMC 14. Then, the system management software 10 continues to run (S100), and the BMC continues to run (S102).

On another aspect, in step S124, if at least one of the two comparison results is negative, the system management software 10 can identify the post-replacement server 12B as a computer server different from the pre-replacement server 12A and continue to proceed to step S100.

FIG. 3A shows the exemplary pre-replacement server identity data HWVPD 22A of the pre-replacement server 12A, including VPD of various hardware assemblies, e.g., VPD of a system board (i.e., a motherboard), CPU 1, and a backplane. FIG. 3B shows the exemplary post-replacement server identity data HWVPD 22B of the post-replacement server 12B after replacing the system board and CPU 1. The post-replacement server identity data HWVPD 22B only differs from the pre-replacement server identity data HWVPD 22A in the serial No./Part ID of the system board and the CPU 1. Thus, the similarity percentage between the pre-replacement server identity data HWVPD 22A and the post-replacement server identity data HWVPD 22B is above 50%, which satisfies the requirement in step S124 in the flowchart of FIG. 2.

Although the present disclosure is described in the context of replacing the motherboard (including one or more other hardware assemblies) of the server, the present disclosure can be used to replace the other hardware assemblies of the server.

The above only illustrates and describes some embodiments of the present disclosure. Modifications and/or changes can be made to embodiments of the present disclosure without departing from the spirit of the present disclosure.

For simplicity, features of the present disclosure are described in a single embodiment. The features can also be provided independently or in any appropriate sub-combination.

What is claimed is:

1. A method for replacing at least one hardware assembly of a data processing apparatus comprising:

managing, by a system management software, the data processing apparatus with a service processor and a plurality of hardware assemblies;

obtaining, by the system management software, first system configuration data, first system vital product data (SVPD), and first server identity data of the data processing apparatus from the service processor or through the service processor;

obtaining, by the system management software, second SVD and second server identity data of the data processing apparatus from the service processor or through the service processor;

comparing, by the system management software, the first server identity data with the second server identity data; and configuring, by the system management software, the data processing apparatus based on the first system configuration data and the first SVPD according to a comparison result, including:

in response to a similarity percentage between the first server identity data and the second server identity data exceeding a predetermined percentage, configuring, by the system management software, the data processing apparatus based on the first system configuration data.

2. The method of claim 1, further comprising:

replacing a hardware assembly in the data processing apparatus.

3. The method of claim 2, wherein the hardware assembly is a motherboard.

4. The method of claim 1, wherein the service processor is a baseboard management controller (BMC).

5. The method of claim 1, further comprising:

storing, by the system management software, the first system configuration data and the first server identity data of the data processing apparatus.

6. The method of claim 1, wherein the predetermined percentage is 50%.

7. The method of claim 1, further comprising:

configuring, by the system management software, the data processing apparatus based on the first system configuration data through the service processor.

8. The method of claim 1, further comprising:

outputting a confirmation request by the system management software before configuring the data processing apparatus based on the first system configuration data.

9. The method of claim 8, further comprising:

configuring, by the system management software, the data processing apparatus based on the first system configuration data after receiving a confirmation input responding to the confirmation request.

10. The method of claim 1, further comprising:

based on the comparison result, configuring, by the system management software, the data processing apparatus based on the first SVPD.

11. A data processing apparatus managed by system management software comprising:

a plurality of hardware assemblies; and a service processor configured to execute the system management software to:

manage the data processing apparatus;

obtain first system configuration data, first system vital product data (SVPD), and first server identity data of the data processing apparatus;

obtain second SVD and second server identity data of the data processing apparatus;

compare the first server identity data with the second server identity data; and configure the data processing apparatus based on the first system configuration data and the first SVPD according to a comparison result, including:

in response to a similarity percentage between the first server identity data and the second server identity data exceeding a predetermined percentage, configuring the data processing apparatus based on the first system configuration data.

12. The apparatus of claim 11, wherein the processor is further configured to replace a hardware assembly in the data processing apparatus.

13. The apparatus of claim 12, wherein the hardware assembly is a motherboard.

14. The apparatus of claim 11, wherein the service processor is a baseboard management controller (BMC).

15. The apparatus of claim 11, wherein the processor is further configured to:

store the first system configuration data and the first server identity data of the data processing apparatus.

16. The apparatus of claim 11, wherein the predetermined percentage is 50%.

* * * * *